United States Patent [19]

Pennewiss et al.

[11] 4,308,120

[45] Dec. 29, 1981

[54] POLYMERIZATION METHOD USING ULTRAVIOLET LIGHT

[75] Inventors: Horst Pennewiss, Darmstadt; Hermann Plainer, Reinheim, France; Juergen Jakob, Lorsch; Juergen Masanek, Pfungstadt, all of Fed. Rep. of Germany

[73] Assignee: Röhm GmbH, Darmstadt-Neu-Kranichstein, Fed. Rep. of Germany

[21] Appl. No.: 76,941

[22] Filed: Sep. 19, 1979

[30] Foreign Application Priority Data

Oct. 2, 1978 [DE] Fed. Rep. of Germany ....... 2842938

[51] Int. Cl.$^3$ ............................................... C08F 2/50
[52] U.S. Cl. .......................... 204/159.23; 204/159.24
[58] Field of Search ....................... 204/159.23, 159.24

[56] References Cited

U.S. PATENT DOCUMENTS

| | | | |
|---|---|---|---|
| 3,655,483 | 4/1972 | Borrell et al. | 204/159.19 |
| 3,912,607 | 10/1975 | Communal et al. | 204/159.23 |
| 3,943,046 | 3/1976 | De Sorga et al. | 204/159.19 |
| 4,105,519 | 8/1978 | Pennewiss et al. | 204/159.23 |
| 4,165,265 | 8/1979 | Nakabayashi et al. | 204/159.23 |
| 4,178,221 | 12/1979 | Boutin et al. | 204/159.23 |

FOREIGN PATENT DOCUMENTS

| | | |
|---|---|---|
| 2248715 | 3/1973 | Fed. Rep. of Germany . |
| 1372374 | 10/1974 | United Kingdom . |
| 1379088 | 1/1975 | United Kingdom . |
| 1479742 | 7/1977 | United Kingdom . |
| 1509312 | 5/1978 | United Kingdom . |

*Primary Examiner*—John C. Bleutge
*Assistant Examiner*—A. H. Koeckert
*Attorney, Agent, or Firm*—Curtis, Morris & Safford

[57] ABSTRACT

What is disclosed is a method for the free-radical polymerization, at a temperature between 0° C. and 100° C. using ultraviolet light, of a material to be polymerized which comprises at least one unsaturated monomer, which method comprises adding an ultraviolet absorber which is only weakly effective or is inert as a free-radical initiator to the material to be polymerized, initiating polymerization of the material in an initiation phase by irradiation thereof with ultraviolet light, controlling the further course of the polymerization in a polymerization phase by increasing the intensity of the irradiating ultraviolet light with time, and concluding the polymerization by irradiation with ultraviolet light in a terminal phase, said ultraviolet absorber absorbing in the wavelength region of the irradiating ultraviolet light.

17 Claims, No Drawings

POLYMERIZATION METHOD USING ULTRAVIOLET LIGHT

The present invention relates to a method for the free-radical polymerization of unsaturated monomers using ultraviolet light.

The release of considerable heat energy during the polymerization process is one of the standard problems presented by the free radical polymerization of unsaturated monomers. If the heat is not conducted away during the polymerization, the polymerizing mixture can heat up to temperatures of more than 100° C.

The results of such an excessive self-heating during polymerization are all negative (e.g. evaporation of the monomers or perhaps of a solvent, bubble formation, discoloration, a decrease in molecular weight, or cross-linking of the polymer). The art early turned its attention to the phenomenon of an undesired strong temperature increase in polymerization, often called "running away" by plant technicians.

The polymerization phenomenon is particularly difficultly controllable when undiluted monomers or monomer mixtures are polymerized or when polymerization takes place in highly concentrated solutions. "Running away" is also especially difficult to avoid if polymerization is carried out in a continuous layer and with insufficient means for cooling.

In a model, overheating is explained as involving an always-increasing decomposition, with increasing temperatures, of the initiator responsible for free-radical formation, whereby under adiabatic conditions there is increasing radical formation, acceleration of the polymerization, and cause for a further temperature increase.

However, the stream of free radicals and, thereby, also the rate of polymerization, can be controlled, that is when the means available for cooling are adequate, if ultraviolet light is used for the generation of radicals. The formation of new radicals and the continuation of the polymerization can be interrupted at any desirable point in time by shutting off the ultraviolet light, provided that the polymerization is carried out with the exclusion of atmospheric oxygen or various derivative peroxidic products. In the presence of peroxides, the adiabatic polymerization continues with self-heating even after the ultraviolet light is turned off if the polymerizing mixture has once exceeded a temperature region of about 40° C. to 60° C.

At lower temperatures, atmospheric oxygen has a polymerization-inhibiting influence. Polymerization in thin layers using ultraviolet light and with access to atmospheric oxygen can only be initiated if considerable concentrations of a photosensitizer are added to the polymerization batch. For very thin layers, anthraquinone derivatives, for example, have been used for this purpose.

At layer thicknesses greater than about 2 mm, polymerization proceeds differently at different sites in the layer. The lower region, resting on a cooling surface, can be controlled by cooling. In the upper region, there is inhibition by atmospheric oxygen to the extent that the access of oxygen has not been prevented by appropriate measures, for example coating with a sealing film, etc. In the central region, in which neither polymerization inhibition by oxygen nor cooling have a sufficient effect, the rate of polymerization is the greatest. If, there, temperatures of 40° C. to 60° C. are exceeded, then the feared "running away" of the reaction occurs in this middle region. Technology has concerned itself with suppressing peroxide formation, proceeding from atmospheric oxygen, with its negative consequences for the polymerization phenomenon. This can occur, for example, by the most complete possible degassing, or by the addition of suitable reducing agents or redox systems to the polymerization batch (cf. German Offenlegungsschrift No. 2,248,715).

Commonly-owned U.S. Pat. No. 4,105,519, granted Aug. 8, 1978 and incorporated herein by reference, teaches a free-radical method for the polymerization of unsaturated water-soluble monomers and monomer mixtures, optionally in admixture with inert substances, having a content from 0.2 to 2 equivalents of polymerizable double bonds per 100 grams of the material to be polymerized, in a layer thickness between 2 mm and 100 mm, at temperatures between 0° C. and 100° C., using ultraviolet light in the presence of atmospheric oxygen. In the method, the material to be polymerized contains at least 1 part per million (ppm) of a water-soluble anthraquinone unsubstituted in the 1-, 4-, 5-, and 8-positions and at least 1 ppm of dissolved chloride ions. Under these conditions, adiabatic polymerization is suppressed. The rate of polymerization remains strictly proportional to the irradiating light. Even after an increase of the temperature to over 40° C.-60° C., the polymerization process can be shut off or decreased by shutting off or weakening the ultraviolet light. Thus, control of the batch occurs here by a time-dependent dosing of the light.

It is in the interest of commercial production, particularly for continuous polymerization processes, to control polymerization processes so extensively that a "running away" can be excluded.

It has now been found that the control of conversion by dosing of the light in dependence on time can be improved by letting the ultraviolet light penetrate into the material to be polymerized with a gradient which decreases as the layer thickness of the material to be polymerized increases.

According to the present invention, this is achieved by the addition of a suitable ultraviolet absorber into the monomer solution. According to the Lambert-Beers Law, there is an exponential increase in the ultraviolet absorption with increasing layer thickness. The ultraviolet radiation will still have its full effect in the surface region, i.e. will initiate the polymerization, but will be always less effective with increasing depth in the layer. Polymerization in the deeper-lying regions can then initiate only if the intensity of the ultraviolet light is increased. By a gradual increase in the intensity of the irradiating ultraviolet light, it is thus possible to "work off" the polymerization layer after layer, proceeding inwardly. In this way, the polymerization front in the process according to the present invention proceeds inwardly from the exposed surface and not predominantly from the inside outwardly, as is the case for ultraviolet-induced polymerization without the use of ultraviolet absorbers providing that there is oxygen inhibition at and proceeding from the surface. In a preferred embodiment of the invention, the ultraviolet absorber to be introduced according to the invention can also include suitable monomers capable of polymerization.

The additional means for control which have been found according to the process of the invention are particularly valuable in systems with high heat development, that is in polymerization batches involving very reactive monomers and large layer thicknesses.

According to the process of the present invention, the polymerization batch contains an effective amount of a suitable ultraviolet absorber in homogeneous distribution. One requirement for a suitable ultraviolet absorber is that it absorb in the region of the irradiating ultraviolet light and that the ultraviolet absorber to be used according to the present invention per se, under otherwise equal reaction conditions, will be at most a certain fraction of the batch necessary to carry out the reaction, less than 20 percent by weight. For example, derivatives of aromatic hydrocarbons which comprise three fused six-membered rings wherein carbon can be replaced by nitrogen in one or more positions, such as anthracene, phenanthrene, and acridine, fall within the class of ultraviolet absorbers which can be used according to the invention. To the extent that the method of the invention is used for the polymerization of water-soluble monomers or monomer mixtures, the aforementioned derivatives of aromatic hydrocarbons contain suitable substituents, preferably hydrophilic groups, such as sulfonic acid and sulfonic acid amide groups, carboxylic acid groups, hydroxy groups, amine groups, or ammonium groups. In this case it should be seen to that the ultraviolet absorbers exhibit a minimal water solubility, for example of about one percent. Yellow to orange dyestuffs which predominantly absorb also in the near ultraviolet region, and derivatives of anthraquinone, to the extent that they fulfill the described requirements, should also be mentioned. In a particularly preferred embodiment of the present invention, use is made to a full extent of the teachings of the aforementioned U.S. Pat. No. 4,105,519.

Exemplary of water-soluble ultraviolet absorbers, the dyestuff Anthrasol orange HR (the sodium salt of the sulfuric acid ester of 6,6′-diethoxy-thioindigo, Color Index No. 73,336) should be mentioned, as well as Benzyl orange (the potassium salt of 4-benzylamino-azo-benzenesulfonic acid), and the sodium salt of anthraquinone-1,5-disulfonate.

As monomers having the necessary properties of ultraviolet absorbers and which are also capable of polymerization, N-vinylimidazole-hydrochloride can be mentioned, for example.

The concentration of ultraviolet absorber in general is between 0.001 and 1 percent, preferably between 0.001 and 0.01 percent, by weight of the entire batch and is, thus, in the region of concentration of the ultraviolet initiator added.

The concentration of ultraviolet absorber can be optimally suited to a specific polymerization batch, which can be accomplished empirically without any particular bother. This can take place by a comparison of the ultraviolet absorption in the region from 320 nanometers (nm) to 400 nm with and without absorber. In such a comparison, the transmission should be different by at least 10 percent.

Fundamentally, the process of the present invention can be carried out in imitation of known ultraviolet polymerization methods in concentrated solutions or in bulk. As initiators, for example, the usual initiators for ultraviolet polymerization are usable in the conventional concentrations, for example initiators from the class of benzoin, benzophenone, and thioxanthone derivatives, as well as the thermostable azo-initiators. Benzoin-ethyl ether and benzoin-butyl ether, dichloroacetophenone, diethoxyacetophenone, benzil-dimethyl ketal, 2-chloro-thioxanthone and 2-methylthioxanthone, and dibenzosuberone should be specially mentioned.

The concentrations of initiator in the ultraviolet polymerization according to the invention as a rule are between 1 part per million and 1 percent by weight, calculated on the total batch. According to the invention, those monomers having free-radically polymerizable or at least copolymerizable carbon-carbon double bonds, for example in the form of a vinyl group, a vinylidene group, or a vinylene group, come into question. These double bonds are preferably activated by a carboxyl group or a derivative thereof, such as an ester or amide group, or are activated by a nitrile, halogen, or alkoxy group, and/or by an aromatic or heterocyclic group [cf. Houben-Weyl, "Methoden der organischen Chemie", Vol. XIV/I, Verlag Georg Thieme (1961), particularly pages 24–64].

Mentioned by way of example are monomers of the general formula

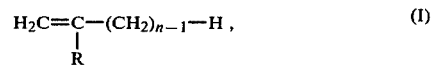

wherein n has the value 1 or 2 and R is —COOH, or suitable salts derived therefrom, or COOR$_1$ wherein R$_1$ is optionally-substituted alkyl having 1 to 18 carbon atoms, or R is —CONR$_2$R$_3$, wherein R$_2$ and R$_3$ are hydrogen or alkyl having 1 to 4 carbon atoms, or R is —CN. Those compounds of the general formula (I) wherein R is a hydrophilic or hydrophilically-substituted group, such as the amido group or a hydroxy-substituted or amine-substituted ester group, are of particular significance, as will be described later in detail. In addition, such monomers should be included in which, in the general formula (I), R is —OOCR$_4$ wherein R$_4$ is alkyl having 1 to 18 carbon atoms, or in which R is —OR$_5$ wherein R$_5$ is optionally-substituted alkyl having 1 to 3 carbon atoms, or in which R is an optionally-substituted aryl group, particularly phenyl, or is a heterocyclic group.

Mentioned by way of example are: vinyl esters such as vinyl acetate and vinyl propionate; vinyl ethers such as methyl-, ethyl-, isobutyl-, and octadecyl-vinyl ethers; aromatic vinyl compounds such as styrene, vinyl toluene, and α-methyl-styrene; and heterocyclic vinyl compounds such as vinyl pyridine, vinyl pyrrolidone-2, vinyl imidazole, vinyl imidazoline, vinyl carbazole, N-vinyl-succinimide, N-vinyl-1, 3-oxazolidone-2, and alkyl derivatives thereof. Also further mentioned are unsaturated acids and anhydrides such as itaconic acid, maleic acid, fumaric acid, etc., as well as the halogenated, particularly chlorinated, vinyl compounds such as vinyl chloride, vinylidene chloride, etc.

The selection of the monomer or monomers depends on the polymer to be prepared. With regard to experience known in the art, homopolymers and copolymers may be prepared in this way. Suitably, the relative amount of monomers which themselves absorb ultraviolet is so apportioned that no detriment to the process can result.

In case that ultraviolet-absorbing monomers are added to the reaction as ultraviolt absorbers, the critical concentration, which suitably should not be exceeded, is about one percent, by weight of the total batch.

For the special embodiment of the invention using water-soluble monomers, in general those monomers can be used which meet the condition of water-solubility, optionally with the addition of small amounts of water-insoluble monomers. The condition of water-solubility should in this case naturally also be met by the remaining components of polymerization batch, such as the initiators, ultraviolet absorbers, chain-transfer agents, etc.

The use of highly reactive water-soluble monomers in the polymerization should be mentioned, for example the polymerization of acrylamide and methacrylamide which tend to cross-link on overheating.

Further unsaturated water-soluble monomers which can be polymerized according to the invention either alone or in admixture with the aforementioned amides are acrylic acid, methacrylic acid, and the hydroxyalkyl esters and aminoalkyl esters of these acids, as well as their aminoalkyl amides. Examples of monomers of this type are 2-hydroxyethyl-acrylate or -methacrylate, 2-hydroxypropyl-acrylate or -methacrylate, 4-hydroxylbutyl-acrylate or -methacrylate, dimethylaminoethyl-acrylate or -methacrylate, diethylaminoethyl-acrylate or -methacrylate, piperidinoethyl-acrylate or methacrylate, or morpholinoethyl-acrylate or -methacrylate. Also, the water-soluble salts or quaternization products of the aforementioned aminoalkyl esters and aminoalkyl amides come into consideration, as well as vinyl pyrrolidone, vinyl imidazole, vinyl imidazoline, vinyl pyridine, vinyl sulfonic acid, styrene sulfonic acid, and acryl-taurine or methacryl-taurine, inter alia. As water-insoluble comonomers, which are to be used only in such amounts that water solubility is retained, the following can be mentioned by way of example: alkyl esters of acrylic acid and methacrylic acid, acrylonitrile or methacrylonitrile, styrene, vinyl toluene, vinyl chloride, vinylidene chloride, vinyl esters, or maleic acid anhydride.

Practically, the process of the present invention can be carried out with the widest use of pertinent known measures. Care should be taken to assure a homogeneous distribution in the reaction batch of one or more ultraviolet absorbers suitable according to the present invention.

Apart from any optionally-present insoluble inert substances distributed in the polymerizing mixture, the mixture should form a homogeneous phase. Insofar as the named monomers are not present in liquid form at temperatures between 0° C. and 100° C., they can be converted into a homogeneous phase by small amounts of solvents. The solvents which are suitable are those which do not themselves absorb ultraviolet. Water plays an important role, as well as organic solvents such as alcohols, ketones, hydrocarbons, esters, amides, nitrile, and, optionally, acids or bases also suitable as solvents.

The polymerization is initiated by irradiation with ultraviolet light of a wave length between 320 nm and 400 nm, especially between 320 nm and 360 nm (for example using a high-pressure mercury lamp or, preferably, a low-pressure mercury lamp) at temperatures between 0° C. and 100° C., preferably in the temperature region from 20° C. to 60° C. During the polymerization process, the chosen temperature can be maintained by cooling of the container or by passing air thereover. The control of the polymerization process occurs according to the present invention by a progressive increase in the intensity of the ultraviolet light, whereby, progressively, the polymerization of layer after layer of the batch is "worked off" from the outside toward the inside or from the top down.

The increase in the light intensity during the polymerization is achieved in a manner known per se by a continuous or step-wise regulation of a dimmer or by altering the interval: irradiation/dark time. In a commercial operation, the control of the light intensity can occur automatically, for example by using suitable light sensors and/or temperature sensors. The duration of the polymerization process, depending on the kind of monomer or monomers and the layer thickness, is generally from 3 minutes to 120 minutes, preferably from 10 to 60 minutes. As a rule, the region of the underside of the layer remains fluid longer using the method of the invention, whereby heat removal from below is indubitably promoted.

In particularly preferred embodiments, the initial polymerization phase is at most ten minutes long, and preferably one to five minutes. During this period, ultraviolet light of high intensity is preferably used, for example light of an intensity about twice that with which the polymerization then proceeds further.

The total duration of irradiation with ultraviolet light is typically between three minutes and 120 minutes, but these limits can be altered in particular cases.

In the terminal phase of the polymerization, there is, preferably, a renewed large increase in the intensity of the ultraviolet light. Suitably, the increase is such that the integrated light intensity in the terminal phase is of the same order of magnitude as the integrated intensity of the total ultraviolet light previously used to irradiate the polymerization batch.

In the already-mentioned preferred embodiment of the invention, which relies on the teachings of U.S. Pat. No. 4,105,519, the widest use can be made of the teachings of this patent. The polymerization can be carried out in a technically analogous manner with the same monomers and using the water-soluble anthraquinone derivatives there described, which are unsubstituted in the 1-, 4-, 5-, and 8-positions and which carry hydrophilic substituents in one or more other positions. The alkali metal salts of anthraquinone-2-sulfonic acid, of anthraquinone-2,6-disulfonic acid, and of anthraquinone-2-carboxylic acid should be especially mentioned.

In this case, the monomer solution contains at least 1 ppm of the water-soluble anthraquinone derivative unsubstituted in the 1-, 4-, 5-, and 8-positions and at least 10 ppm of dissolved chloride ions, as well as one or more suitable water-soluble ultraviolet absorbers. The technical performance of the polymerization can follow in the same manner in reliance on the aforementioned U.S. patent. A "degassing" of the polymerization mixture can be omitted.

The invention is preferably used for the polymerization of water-soluble monomers or monomer mixtures at a monomer concentration of at least 75 percent. The remainder is preferably water. The 75–100 percent polymers which are obtained are solid substances which can be ground into a granular water-soluble material.

Although the anthraquinone derivative, together with the chloride, acts as a photoinitiator, still further known photoinitiators can optionally be used in addition in the conventional amounts.

The polymerization batches according to the present invention can also contain chain-transfer agents which are conventional for polymerizations of a pertinent kind, for example sulfur regulators such as pentaerythritol-tetrathioglycolate, 2-mercapto-ethanol, thioglycolic acid, etc.

The concentrations of chain-transfer agent in each case agree with the amounts conventionally used. In general, they are from 0.01 to 1 percent by weight of the polymerization batch. In addition, the batch can contain further conventional auxiliary agents, for example complex-formers, in the usual concentrations for purposes of this type.

The water-soluble polymers obtained have their conventional uses as binders, dressing agents and sizing agents, thickening agents, flocculants, etc. Because of the possibility of producing water-soluble polymers in a highly-concentrated solid form, the invention has particular significance for the preparation of sedimentation agents and flocculating agents.

A better understanding of the present invention and of its many advantages will be had by referring to the following specific Example, given by way of illustration.

EXAMPLE 1

A polymerization batch comprises the following:

| | |
|---|---|
| 67.5 g | of acrylic acid amide |
| 22.5 g | of 2-trimethylammonium-ethyl-acrylate-chloride |
| 9.0 g | of adipic acid |
| 0.0128 g | of anthraquinone-2-sulfonate |
| 0.009 g | of Anthrasol orange HR (Color Index No. 73 336) |
| 0.009 g | of the sodium salt of ethylenediamine tetraacetic acid |
| 11.0 g | of water |
| 2.4 g | of pentaerythritol-tetrathioglycolate |

A solution made up of the aforementioned components is poured in a layer thickness of 1 cm into a metal pan maintained at 50° C. The irradiation program for an isothermal polymerization at 60° C. is carried out as follows:

Irradiation with a 20 watt low-pressure mercury exposure lamp (emission between 320 nm and 360 nm) at a distance of 48 cm. The lighting intensity (in lux) is adjusted by means of a dimmer control as follows:

| | |
|---|---|
| 5 minutes at 33 lux | (initiation phase) |
| 20 minutes at 17 lux | |
| 20 minutes at 22 lux | |
| 10 minutes at 25 lux | |
| 10 minutes at 28 lux | |
| 10 minutes at about 200 lux | (termination of polymerization) |

Total elapsed time: 85 minutes.

The hard, brittle, light-yellow polymer is milled and tested as a flocculant in the form of an aqueous 1 percent solution (4500 mPa.s). The product shows an outstanding effect. Without the addition of the Anthrasol orange HR ultraviolet absorber, the batch already "runs away" in the first-half of the polymerization phase.

Benzyl orange (0.001 percent by weight), the sodium salt of anthraquinone-1,5-disulfonic acid (0.05 percent by weight), and N-vinyl imidazole hydrochloride (1 percent by weight) can also be used as ultraviolet absorbers in processes analogous in principle to that of Example 1.

What is claimed is:

1. A method for the free-radical polymerization of a polymerizable material by irradiation of said material with ultraviolet light at a temperature between 0° C. and 100° C. according to a predetermined program, which method comprises, as the first step in said program, initiating polymerization of said polymerizable material in an initiation phase by irradiating said material with ultraviolet light having a wavelength between 320 nanometers and 400 nanometers in the presence of a free-radical photoinitiator, and then, as a further step in said program, controlling the further course of the polymerization in a polymerization phase by increasing the intensity of said ultraviolet light with time during said polymerization phase, relative to the intensity of said light at the onset of said polymerization phase, said polymerizable material comprising a major amount of at least one monomer which does not absorb ultraviolet light of the aforementioned wavelength and, distributed homogeneously therethrough, an ultraviolet absorber which does absorb ultraviolet light of the aforementioned wavelength but which is inert, or only weakly effective, as a free-radical photoinitiator.

2. A method as in claim 1 wherein said polymerizable material comprises a major amount of a water-soluble monomer.

3. A method as in claim 2 wherein said free-radical photoinitiator is at least 1 part per million of a water-soluble anthraquinone compound unsubstituted in the 1-, 4-, 5-, and 8-positions and at least 10 parts per million of dissolved chloride ions, and wherein said ultraviolet absorber is inert to oxidation and reduction.

4. A method as in claim 3 wherein said polymerizable material comprises from 0.2 to 2 equivalents of polymerizable double bonds in each 100 grams of said material.

5. A method as in claim 3 wherein said polymerizable material is polymerized in a layer thickness between 2 mm and 100 mm.

6. A method as in claim 3 which proceeds in the presence of oxygen.

7. A method as in claim 3 wherein the source of said ultraviolet light is a low-pressure mercury lamp and said ultraviolet light has a wavelength between 320 nm and 360 nm.

8. A method as in claim 1 wherein said ultraviolet absorber is a member selected from the group consisting of anthraquinone, yellow-to-orange dyestuffs, aromatic hydrocarbons comprising three fused six-membered rings wherein carbon in one or more positions can be replaced by nitrogen, and such members comprising at least one substituent solubilizing them in said polymerizable material.

9. A method as in claim 8 wherein said aromatic hydrocarbons comprising three fused six-membered rings wherein carbon in one or more positions can be replaced by nitrogen comprise anthracene, phenanthrene, or acridine rings.

10. A method as in claim 8 wherein said ultraviolet absorber is Anthrasol orange HR.

11. A method as in claim 1 wherein said ultraviolet absorber is present in an amount from 0.001 percent to 1 percent, by weight of the polymerization batch.

12. A method as in claim 1 wherein said polymerizable material is first irradiated in said initiation phase with ultraviolet light of high intensity and the intensity of the ultraviolet light is then reduced at the onset of said polymerization phase.

13. A method as in claim 2 wherein the intensity of the irradiating ultraviolet light in said initiation phase is about twice as great as the intensity of the irradiating ultraviolet light at the onset of said polymerization phase.

14. A method as in claim 1 wherein said initiation phase is at most 10 minutes long.

15. A method as in claim 1 wherein the total duration of irradiation with ultraviolet light is from 3 minutes to 120 minutes.

16. A method as in claim 1 wherein, as a further step in said program, the intensity of said ultraviolet light is greatly increased at the end of said polymerization phase.

17. A method as in claim 16 wherein the energy input of the ultraviolet light at the end of said polymerization phase is of the same order of magnitude as the total energy input of the ultraviolet light prior to the end of said polymerization phase.

* * * * *